United States Patent [19]
Bierbrauer et al.

[11] Patent Number: 4,773,457
[45] Date of Patent: Sep. 27, 1988

[54] TELESCOPIC COVER

[75] Inventors: Heinrich Bierbrauer; Wolfgang Diels, both of Munich, Fed. Rep. of Germany

[73] Assignee: Gebr. Hennig GmbH, Ismaning, Fed. Rep. of Germany

[21] Appl. No.: 29,446

[22] Filed: Mar. 23, 1987

[30] Foreign Application Priority Data

Apr. 7, 1986 [DE] Fed. Rep. of Germany ....... 3611576

[51] Int. Cl.[4] .............................................. B60B 33/00
[52] U.S. Cl. ..................................... 150/52 R; 16/22
[58] Field of Search ............... 150/52 R; 16/43, 18 R, 16/20, 21, 22, 23

[56] References Cited

U.S. PATENT DOCUMENTS 1,743,255 1/1930 Vervoorth .............................. 16/21

FOREIGN PATENT DOCUMENTS 3330289 12/1984 Fed. Rep. of Germany .

Primary Examiner—William Price
Attorney, Agent, or Firm—Thomas & Kennedy

[57] ABSTRACT

The invention relates to a telescopic cover with support rollers which are mounted so as to be rotatable about a first axis which extends at right angles to the direction of travel and capable of limited pivotal movement about a second axis which extends in the direction of travel through the center of the support roller. Such a telescopic cover is distinguished by statically satisfactory mounting of the support rollers even when transverse forces occur.

3 Claims, 3 Drawing Sheets

TELESCOPIC COVER

BACKGROUND OF THE INVENTION

The invention relates to a telescopic cover for protection of machine tools and other industrial equipment.

A telescopic cover is known, for example, from German Patent Specification No. 33 30 289. In that disclosure the support rollers are each arranged so as to be capable of limited swinging movement like a pendulum in an angular range of approximately 5° about a horizontal axis which extends in the direction of travel. The intention is that, as a result, the support rollers are automatically set under their own weight so that each rests on its entire breadth on the appertaining track.

In this known construction the second axis extends in the direction of movement and is spaced above the appertaining support roller. As more detailed tests show, this results in a statically unstable system when forces occur which act laterally on the telescopic cover. If as a result of a transverse load on the telescopic cover the second axis which extends in the direction of movement shifts to one side or the other out of the vertical central plane which passes through the centre of the roller, then the vertical load results in a tilting moment which attempts to tilt the support roller about a horizontal axis passing through the centre of the roller, and thus leads to loading of the edges of the support roller which is most unfavorable from the point of view of wear.

SUMMARY OF THE INVENTION

The object of the invention, therefore, is to construct a telescopic cover in such a way that a statically stable mounting is always achieved, even taking account of forces acting in the transverse direction on the telescopic cover, and that the support rollers are automatically set so as to achieve a uniform bearing function over the entire breadth of the roller.

BRIEF DESCRIPTION OF THE DRAWINGS

One embodiment of the invention is illustrated in the drawings, in which.

DETAILED DESCRIPTION

Figure 1:
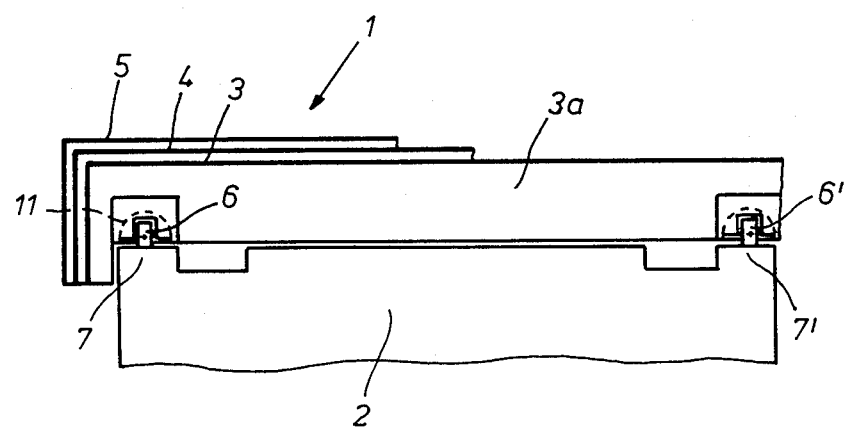
FIG. 1 shows a schematic end view of the telescopic cover according to the invention.

The telescopic cover 1 which is shown quite schematically in FIG. 1 serves to protect the guide track 2 of a machine tool. It comprises a plurality of cover boxes of which only three cover boxes 3, 4, 5 are shown in the drawing for the sake of simplicity.

The cover box is supported at its rear wall 3a by cylindrical support rollers 6, 6' on roller tracks 7, 7' which run parallel to the guide track 2. Similarly, the further cover boxes 4, 5 are supported at their rear walls by support rollers on the roller tracks 7, 7'.

The mounting of the support roller 6 is explained in detail below with the aid of FIG. 2; the other rollers are mounted in a corresponding manner.

The support roller 6 forms the outer ring of a bearing, the inner ring of which is firmly connected by pins 8, 9 to a support part 10 which has an arcuate outer contour 10a on its upper surface.

This support part 10 is supported with its arcuate contour 10a on the base of an equally arcuate groove 11 of the rear wall 3a. The groove 11 is defined on the front and rear faces of the rear wall 3 by a cover plate which is omitted in FIG. 2 for the sake of greater clarity and has a cut-out section shown by the broken line 12 in FIG. 2 to receive the support roller 6.

The centre of curvature of the outer contour 10a of the support part 10 and the centre of curvature of the groove 11 coincide with the centre 13 of the support roller 6.

Figure 2:
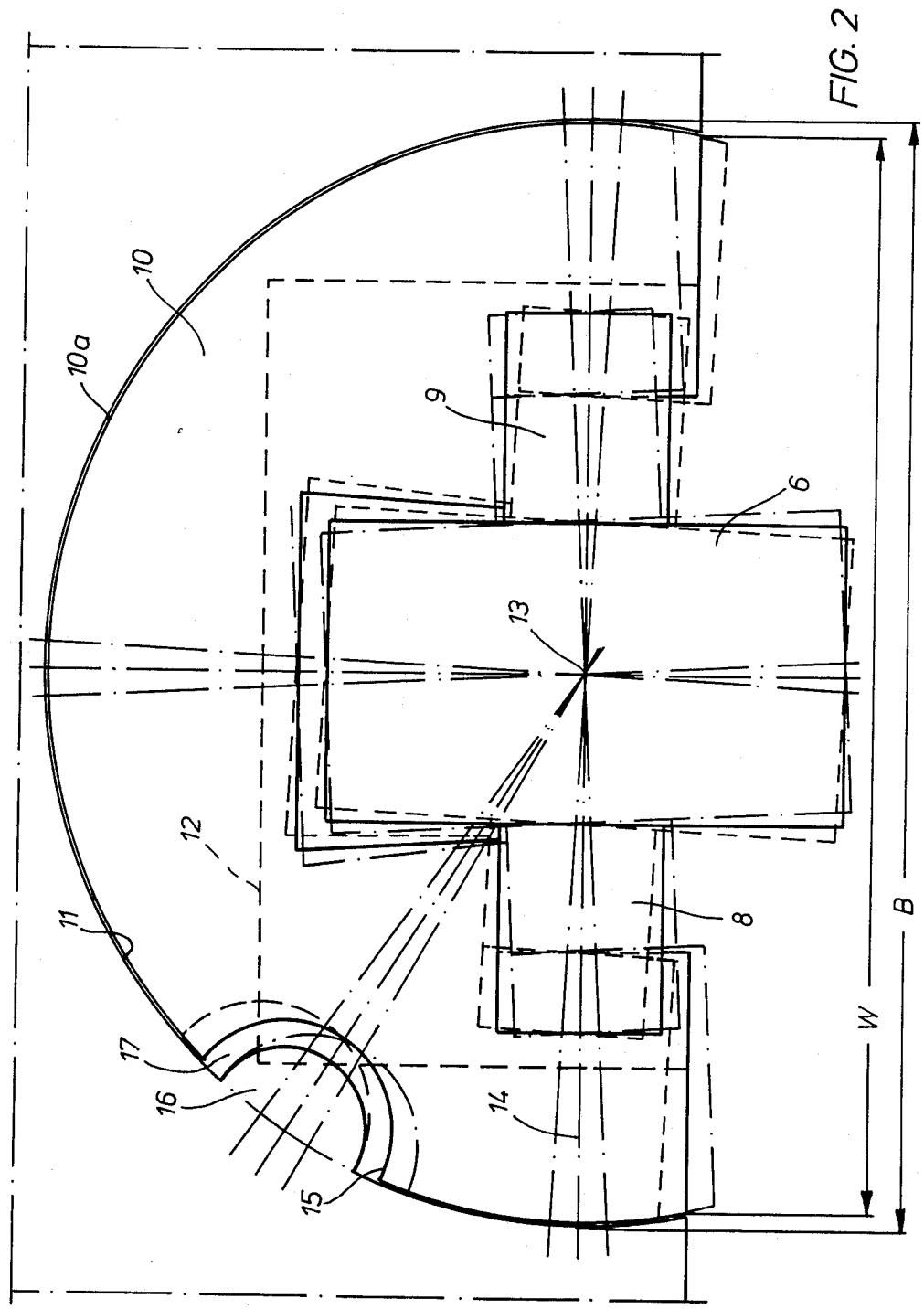
FIG. 2 shows a detail with a support roller, support part and rear wall.

If the direction in which the cover boxes 3, 4, 5 move in operation (at right angles to the drawing plane of FIG. 1) is considered as the direction of travel, then the support roller is on the one hand rotatable about a first axis 14 which extends at right angles to the direction of travel, and on the other hand is pivotally movable about a second axis which extends in the direction of travel (through the centre 13 at right angles to the drawing plane of FIG. 2).

If the support roller 6 and the support part 10 are pivoted out of the neutral central position in a clockwise direction, the resulting position is for example the position indicated by broken lines. One possible position resulting from a pivotal movement in an anti-clockwise direction is shown by dash-dot lines.

The arcuate outer contour 10a of the support part 10 has a recess 15 in which a projection 16 provided in the groove 11 of the rear wall 3a engages leaving a space 17 which permits pivotal movement of the support part 10. In the end positions of the pivotal movement of the support roller 6 and support part 10 shown by broken or dash-dot lines the recess 15 comes to a stop on the projection 16. As a result the pivotal movement of the support roller 6 is confined to the extent necessary for operation of the telescopic cover.

As can be seen from FIG. 2, the segment angle of the arcuate groove 11 of the rear wall 3a is slightly greater than 180°. The segment angle of the arcuate outer contour 10a of the support part 10 is at least 180°; in the illustrated embodiment this segment angle of the outer contour 10a is exactly as great as the segment angle of the groove 11.

The width W of the groove 11 at the open lower end of the groove is therefore slightly smaller than the maximum breadth B of the support part 10. This prevents the support roller 6 and the support part 10 from falling downwards out of the groove 11 into the neutral central position when the telescopic cover 1 is for example placed on the guide track 2 or removed therefrom.

However, the dimensions B and W and the breadth of the space 17 are advantageously such that the support roller 6 can be freely withdrawn downwards out of the groove 11 with the support part 10 after it has first pivoted into one of the two end positions. In this way it is particularly simple to replace the support rollers 6 in case of need.

Figure 3:
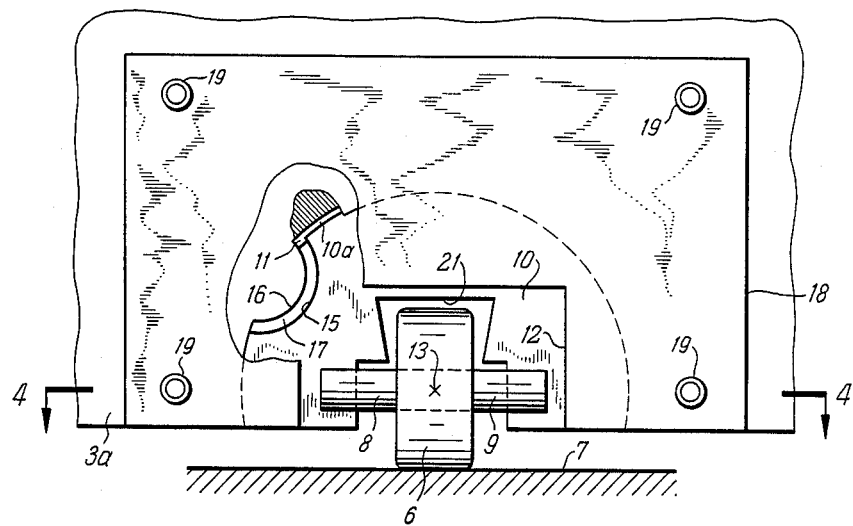
FIG. 3 is a side elevational view, partially sectioned, showing the details of the support roller mounting for the telescopic cover.
Figure 4:
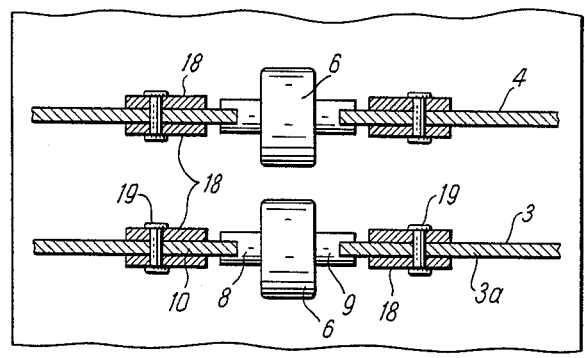
FIG. 4 is a sectional view along the lines 4—4 of FIG. 3.
Figure 5:
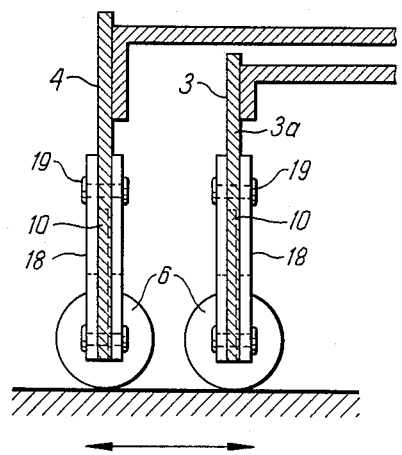
FIG. 5 is a sectional view showing two of the telescopic cover boxes and the roller arrangement therefor.

The details of the mounting arrangement for the roller 6 are shown in FIGS. 3 and 4. In FIGS. 3 and 4 it can be seen that the shafts 8 and 9 are affixed to support part 10, whose arcuate contour 10a fits into groove 11 in rear wall 3a, and is free to move therein about the central axis 13 until recess 15 is stopped by projection 16. Then the amount of movement is governed by the size of space 17. A pair of cover plates 18, having apertures 12 therein providing clearance for roller 6 are mounted on rear wall 3a and held in place by rivets 19, or other suitable means, such as, for example, bolts. In addition, roller 6 rides in a clearance opening 21 in support part 10. The arrows to the right of FIG. 4 show the direction of movement of the cover box 3. FIG. 5 is a sectional elevation view of two cover boxes 3 and 4, which are movable in the direction of the arrows by means of rollers 6.

We claim:

1. A telescopic cover (1) for the guide track (2) of a machine tool, comprising a plurality of telescopically movable cover boxes (3, 4, 5) which are supported at their rear wall by cylindrical support rollers (6,6') on roller tracks (7,7') which run parallel to the guide track (2) in which said support rollers are mounted so as to be rotatable in a support part 10 about a first axis (14) which extends at right angles to the direction of travel, said support part (10) having an arcuate outer contour (10a) and said rear wall (3a) having an arcuate groove therein for movably supporting the arcuate outer contour (10a) of said support part 10 about an axis (13) coincident with the outer of said support roller (6) and extending in the direction of travel of said movable cover boxes (3, 4, 5).

2. Telescopic cover as claimed in claim 1, characterised in that the segment angle of the arcuate groove (11) of the rear wall (3a) is slightly greater than 180° and the segment angle of the arcuate outer contour (10a) of the support part (10) is at least 180°, so that the width (W) of the groove (11) on the open lower end of the groove is slightly smaller than the maximum breadth (B) of the support part (10).

3. Telescopic cover as claimed in claim 1, characterised in that the arcuate outer contour (10a) of the support part (10) has a recess (15) in which a projection (16) provided in the groove (11) of the rear wall (3a) engages leaving a space (17) which permits pivotal movement of the support part (10).

* * * * *